Patented Oct. 3, 1922.

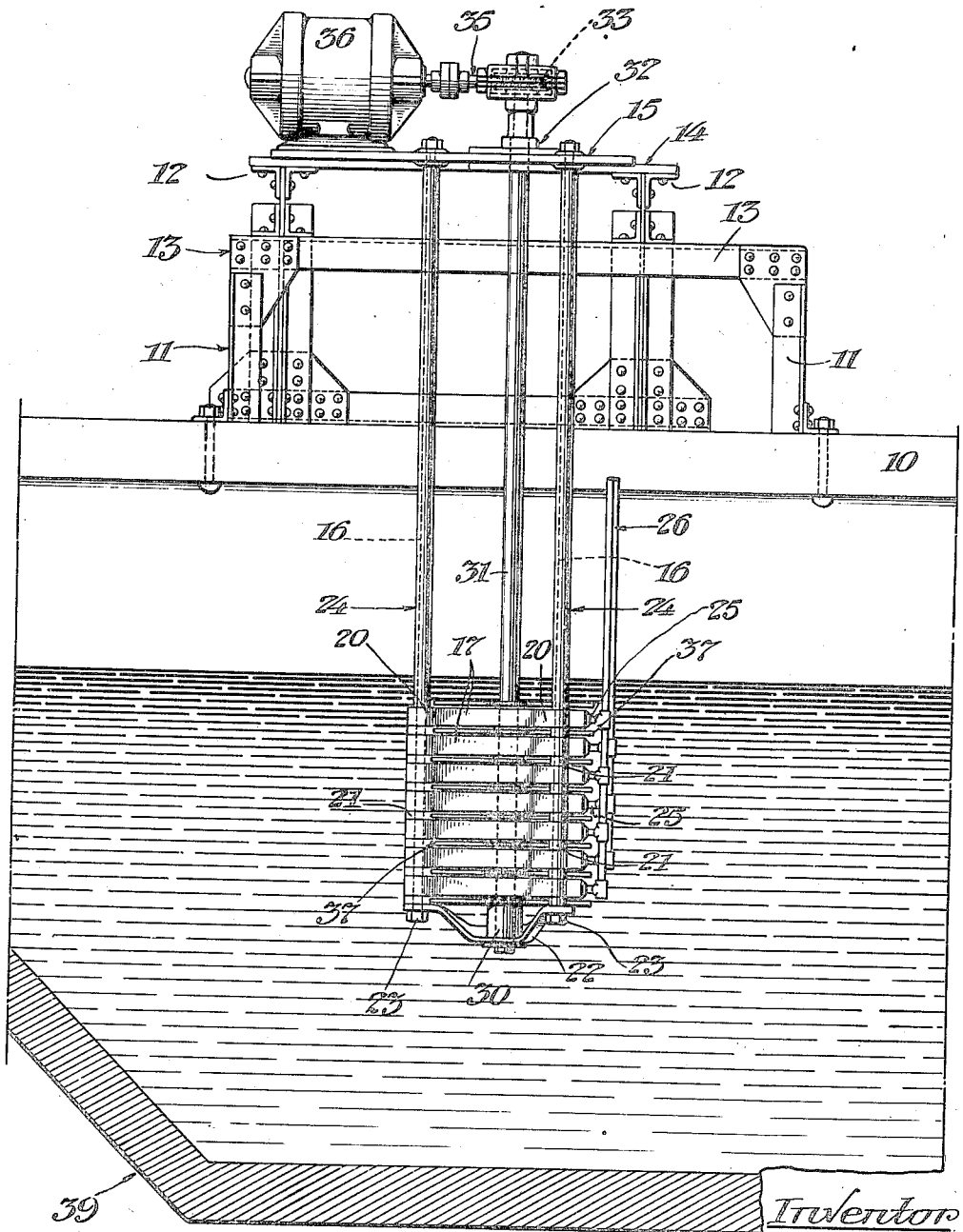

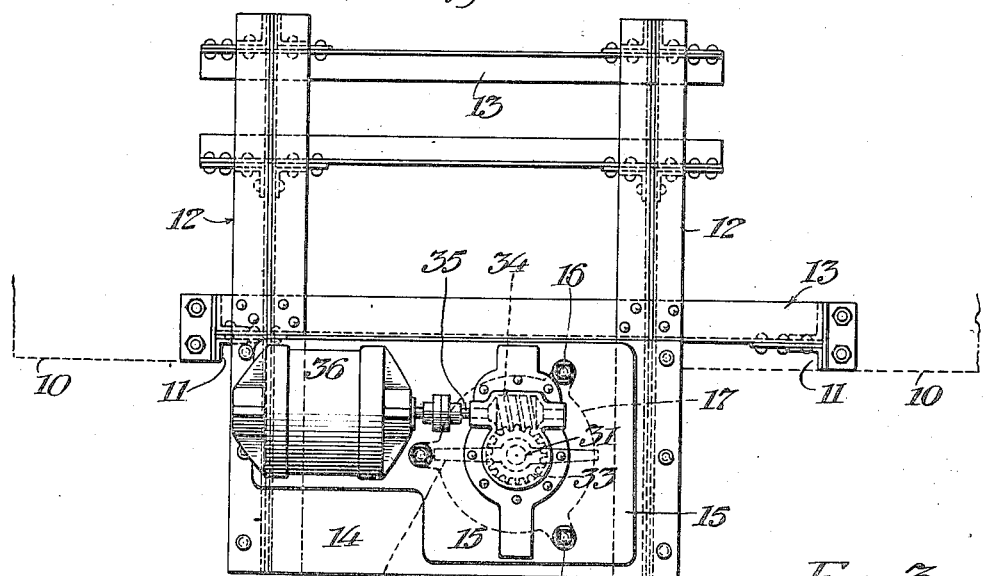
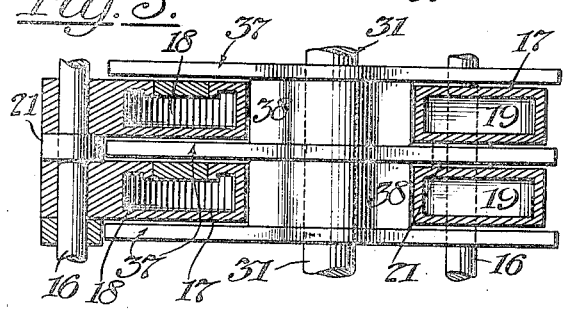
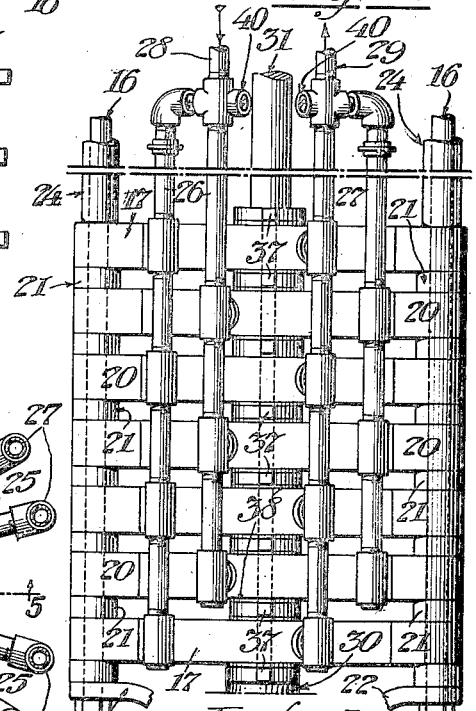
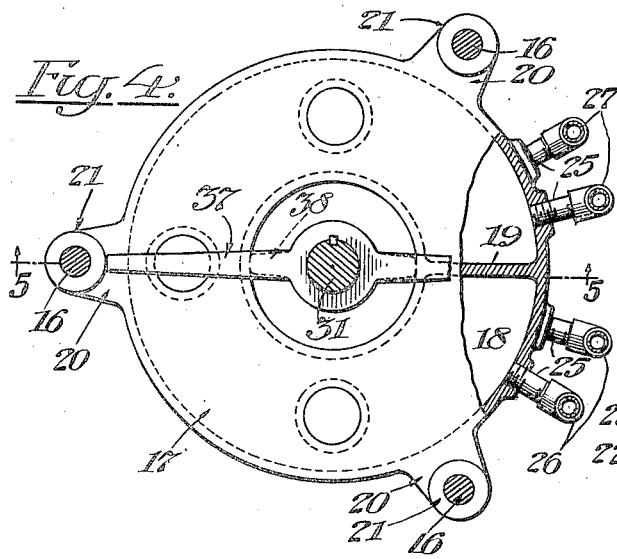

1,430,900

UNITED STATES PATENT OFFICE.

CARL C. HAFERKAMP, OF OSWEGO, NEW YORK, ASSIGNOR TO THE DIAMOND MATCH COMPANY, OF CHICAGO, ILLINOIS, A CORPORATION OF ILLINOIS.

APPARATUS FOR THE PRODUCTION OF CRYSTALS.

Application filed October 23, 1920. Serial No. 420,225.

*To all whom it may concern:*

Be it known that I, CARL C. HAFERKAMP, a citizen of Germany, and resident of Oswego, in the county of Oswego and State of New York, have invented certain new and useful Improvements in Apparatus for the Production of Crystals, of which the following is a specification.

This invention relates to an apparatus for the production of crystals; and the object of the invention is to provide an apparatus of simple and efficient construction and operation for rapidly and economically cooling hot liquors having a content which, in passing to the solid state, is deposited in crystalline form.

In the preferred embodiment of my invention as herein illustrated, the apparatus comprises a series of superimposed chambered units, means for supporting said units within a suitable tank containing the liquor or solution of material to be crystallized, and means for circulating a cooling agent, such as cold water, through the said units in a manner to cool their walls and thus effect the crystallization of the material in contact with their external surfaces, together with a series of vanes mounted to move in close relation to such surfaces and to scrape therefrom the crystals as rapidly as they are deposited. The crystallization being speedily effected the crystals formed are small and are therefore easily moved in the liquor (which is maintained in circulation by the moving vanes) and away from the cooling apparatus.

The invention also comprises various features of construction and combinations of parts which will be hereinafter fully described, and the precise scope of the invention then be defined in the appended claims.

In the drawings—

Figure 1 is a side elevation of a cooling apparatus embodying my invention, showing a liquid tank in section.

Fig. 2 is a plan of the apparatus.

Fig. 3 is an elevation of the cooling units, the piping therefor, and the scrapers.

Fig. 4 is a plan, partly in section, of one of the units and its adjuncts.

Fig. 5 is a transverse vertical section, as on the line 5—5 of Fig. 4.

Referring to the drawings, 10 designates an elevated bed upon which the framework for supporting the cooling apparatus is erected. This framework, in the present instance, comprises spaced-apart standards 11, rails 12 and cross-bars 13; the whole being properly assembled and rigidly riveted or bolted together. Upon this framework is a table 14 supporting a substantial base plate 15. Bolted to this plate are the upper ends of a series of spaced-apart parallel rods 16, of which, in the present instance, there are three. These rods depend some distance below the bed 10, and support at their lower ends a series of superimposed chambered structures 17 through which a cooling agent, such as cold water, is circulated, as hereinafter described.

Each of these unitary structures, in its preferred form, comprises an annular body having its interior cored or hollowed out to form an annular chamber 18 interrupted by a radial partition 19. This body is provided with a series of peripheral lugs 20 which correspond in number and position with the rods 16 and are perforated so that the body can be readily applied to the rods. A plurality of structures, with alternating spacing collars 21, are applied to the lower ends of the rods, and the whole then locked in spaced relation to each other by a spider 22 having perforated arms which are applied to the lower threaded extremities of the rods 85 and there secured in place by nuts 23. The first or uppermost structure is positioned against long spacing tubes 24 applied to the rods 16. In the peripheral walls of the respective structures are openings to which are fitted branch connections 25 from vertical water-circulating pipes. There are two parallel inflow pipes 26 connected with alternate structures 17 and two parallel outflow pipes 27 also connected with alternate structures, the two pairs of pipes being connected at their upper ends to ingress and egress pipes 28, 29, respectively, leading to a suitable cold water-circulating system, whereby water may be caused to circulate to and throughout the entire series of chambered structures.

The spider 22 is provided with a central bearing 30 for the foot of a vertical shaft 31 which extends through the central openings of the superimposed annular structures. The upper end of this shaft, which extends through a suitable bearing 32 in the base plate 15, is equipped with a worm wheel 33 in mesh with a worm 34 on a power driven shaft 35, whereby the vertical shaft can be continuously rotated at a relatively slow speed. In the present instance the worm-shaft is coupled to and actuated by the shaft of an electric motor 36 which is conveniently supported on the base plate 15. 37, 38 designate two series of vanes having their hubs keyed or otherwise affixed to the shaft 31 so as to rotate with the shaft. The vanes 37, which are each of sufficient length to sweep the entire face of an annular structure 17, are mounted in spaced relation to each other on the shaft 31 so as to rotate within the horizontal spaces between adjacent structures, and also upon the top and bottom of the uppermost and lowermost structures, respectively. Hence the vanes 37 perform the function of scrapers upon the adjacent upper and lower surfaces of the series of structures.

The vanes 38 are relatively short, and they are so disposed on the shaft as to rotate within the central openings of the structures 17 and thus act as scrapers upon the opposing circular walls of said openings. The vanes 38 also serve as spacers between the adjacent vanes 37.

The operation of the apparatus above described is as follows:

A suitable tank, as 39, supplied with hot liquor to be treated for the production of crystals, is positioned below the bed 10 so that the battery of cooling structures 17 depend into the liquor. The motor is then energized and the valves of the cold water system are opened. Through the motor and worm gearing described the shaft 31 with its vanes is continuously rotated; and from the water system cold water is caused to circulate to and throughout the series of chambered cooling structures. The water lowers the temperature of the walls of the several chambers and in consequence the crystalline content of the liquor in contact with such walls is rapidly cooled, such content being thus deposited in crystals on the cooled surfaces. The vanes in their rotation progressively scrape the crystals from the opposing surfaces of the cooling structures, and such crystals, being small owing to their rapid formation, are easily moved in the liquor and away from the cooling structures. The vanes in their rotation set up and maintain a circulation of the liquor, thereby contributing to the easy movement of the crystals.

The connections of the parallel inflow and outflow pipes with the respective pipes 28, 29 are preferably provided with fittings 40 to which steam pipes may be connected when it is desired to blow out and clean the chambered structures.

It is to be understood that I do not limit myself to the specific details of construction herein disclosed, as the form of apparatus illustrated may be modified within the principle of my invention and the scope of the appended claims.

I claim—

1. In an apparatus for producing crystals from hot liquors, the combination of a series of superposed annular units, means supporting said units in spaced relation to each other, means for circulating a cooling agent through said units, a rotary shaft encircled by said units, vanes mounted on said shaft to rotate in the spaces between the external flat surfaces of the adjacent units, and other vanes mounted on said shaft to rotate within the central circular openings of said units.

2. In an apparatus for producing crystals from hot liquors, the combination with a supporting element of a series of rods depending therefrom, a series of chambered units arranged in spaced parallel relation to each other upon said rods, a bearing member connecting the lower ends of said rods, a vertical shaft having its bearings in the said member and supporting element, circulating connections amongst the said chambered units, and scraper elements mounted on said shaft to rotate adjacent the external surfaces of the respective units.

Signed at Oswego, in the county of Oswego and State of New York this 21 day of Oct. A. D. 1920.

CARL C. HAFERKAMP.